Sept. 16, 1924.
W. BARBER
1,508,672
SUPPORTING STAND FOR AUTOMOBILES AND OTHER PURPOSES
Filed Sept. 28, 1921
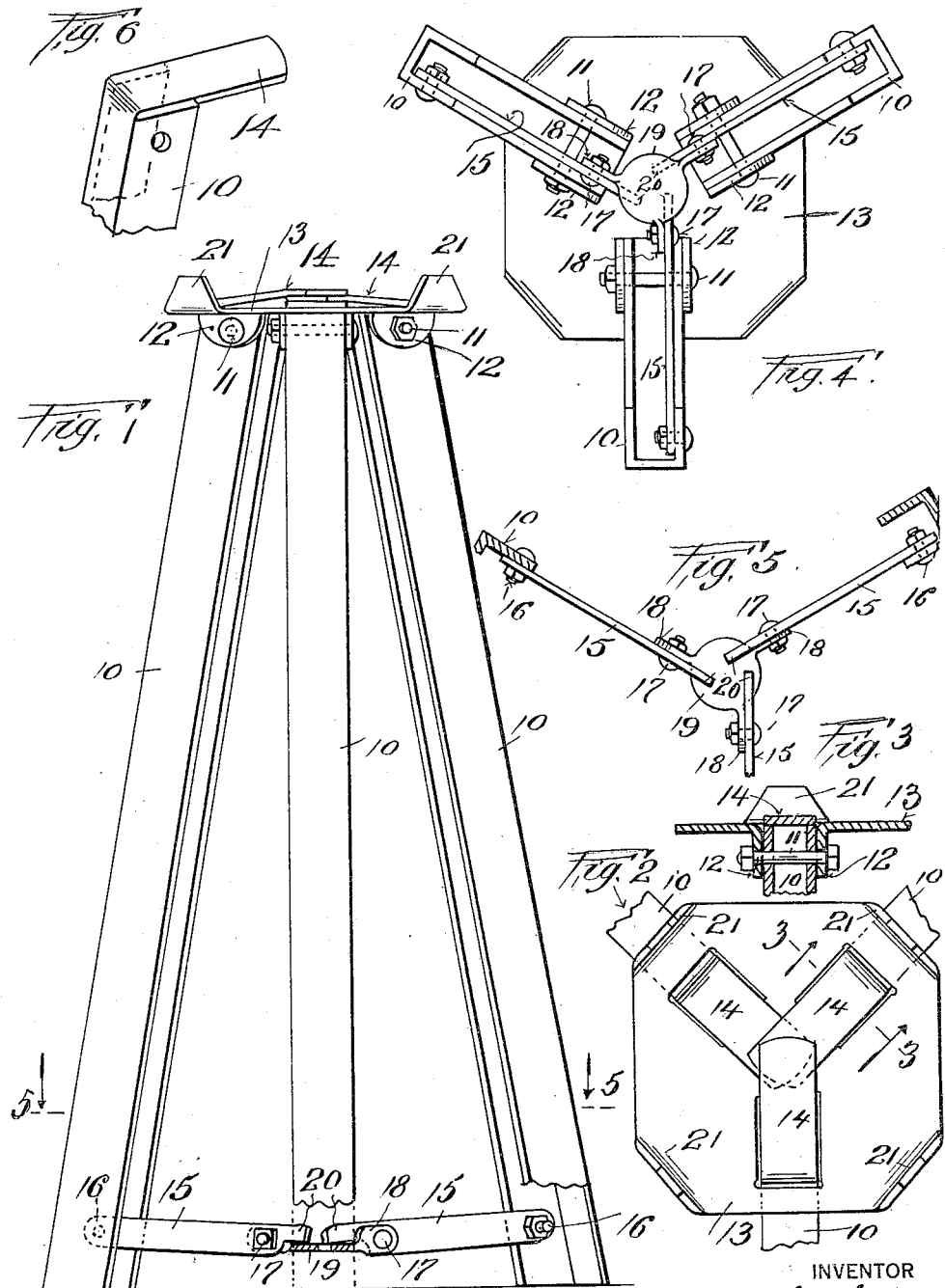
INVENTOR
William Barber
BY his ATTORNEYS
Darby & Darby Patented Sept. 16, 1924.

1,508,672

UNITED STATES PATENT OFFICE.

WILLIAM BARBER, OF BROOKLYN, NEW YORK.

SUPPORTING STAND FOR AUTOMOBILES AND OTHER PURPOSES.

Application filed September 28, 1921. Serial No. 503,969.

*To all whom it may concern:*

Be it known that I, WILLIAM BARBER, a citizen of the United States, residing at Brooklyn, in the county of Kings, State of New York, have made a certain new and useful Invention in Supporting Stands for Automobiles and Other Purposes, of which the following is a specification.

This invention relates to supporting stands for automobiles and other purposes.

The object of the invention is to provide a supporting stand which is simple in structure, economical to manufacture, and efficient in operation.

A further object of the invention is to provide a supporting stand of the nature referred to which is collapsible so as to be carried as an ordinary tool in a tool box.

A further object of the invention is to provide a supporting stand of the nature referred to which is collapsible or foldable, and which, when in distended position for use, is held against collapsing by the weight imposed by the object to be supported.

Other objects of the invention will appear more fully hereinafter.

The invention consists substantially in the construction, combination, location and relative arrangement of parts all as will be more fully hereinafter set forth, as shown in the accompanying drawing, and as finally pointed out in the appended claims.

Referring to the drawing,—

Fig. 1 is a view in side elevation, parts broken out and parts in section, showing a collapsible supporting stand embodying the principles of my invention;

Fig. 2 is a view in top plan, the supporting legs being broken off;

Fig. 3 is a broken detail view in section on the line 3—3, Fig. 2, looking in the direction of the arrows;

Fig. 4 is a view in bottom plan view looking upwardly of the structure shown in Fig. 1;

Fig. 5 is a view in section on the line 5—5, Fig. 1, looking in the direction of the arrows;

Fig. 6 is a broken detail view in perspective showing the upper end of a supporting leg.

In the operation of automobiles, it is a common practice, in order, for instance, to remove a wheel, or to remove a tire from a wheel, to employ a jack placed under some convenient part of the automobile for the purpose of raising the automobile to enable the tire or the wheel to be removed, the jack being left in its raised position under the car during the operation of removing the tire or the wheel. It frequently happens, through failure to apply the brakes, or in case it is necessary to release the brakes, during the operation of removing a wheel or a tire after the car has been jacked up, that the car will move forwardly or backwardly, thereby upsetting the jack, and causing the raised part of the car to fall to the ground. If the wheel has been removed, the danger is thus incurred of breaking, bending or otherwise injuring the axle from which the wheel has been removed, or if the tire has been removed without removal of the wheel, of breaking, bending or otherwise injuring the wheel rim or felly.

It is among the special purposes of my present invention to provide a supporting stand which is simple in structure, economical to manufacture, strong and sturdy, and foldable or collapsible, so as to be carried in the tool box of the car, and which, when a car has been jacked up, may be placed underneath a convenient part of the frame to receive and support the car in its raised position after being lowered thereon by releasing the jack, and which stand, when distended into position for use, and after receiving the weight of the raised car thereon, is held by the weight of the car against the possibility of folding up or collapsing.

In the accompanying drawing I have shown a structure which is simple and efficient, which embodies the principles of my invention, and which consists in vertically disposed supporting legs 10, in the form of U-shaped channel parts having the channels thereof presented inwardly. The upper ends of the channel legs are pivotally connected as, for instance, by means of pivot bolts 11 extending transversely through openings formed through the side walls of the channel legs at the upper ends thereof and through lugs or ears 12 depending from a top plate 13. In practice the ears 12 are formed integrally with the plate 13 by slitting the latter and bending the ears out of the plane of said plate as clearly shown in Figs. 1 and 3, the upper ends of the legs 10 projecting into the openings formed in the plate 13 by bending down the ears 12 therefrom.

The upper ends of the base wall of the U-shaped legs extend beyond the upper ends of the side walls of said legs to form lips 14. These lips extend through the openings in the plate 13, and lap over or upon each other as clearly shown in Fig. 2. At their lower ends the legs are connected together by links 15, which are pivotally connected as at 16 at their outer ends within the channels of the legs.

The inner ends of the links 15 are pivotally connected as at 17 to lugs 18 formed on a plate 19. Each link 15 is formed with an extension 20 at its end which extends inwardly over the plate 19 and contacts with the upper surface of said plate when the supporting stand is in its distended position ready for use, thereby forming a stop for the linkage connection at the lower ends of the legs to prevent them from being displaced to fall into distended relation.

The operation of the device is exceedingly simple. In the position of the parts shown in Fig. 1, the supporting stand is in distended position ready for use, the lower ends of the legs being spread apart from each other with the extensions 20 of the connecting links 15 bearing upon the upper face of the disk 19, thereby forming a stop to limit the extent of swinging the movement of the lower ends of the legs apart from each other. The pivotal connections 11 of the upper ends of the legs to the supporting plate 13 permit the lower ends of the legs to swing apart into distended position, or to be folded together when the linkage connection of the lower ends of the legs collapse.

In the supported position of the legs as shown in Fig. 1, the lips 14 at the upper ends of the legs, and which extend through the openings in the supporting plate 13, lap over and upon each other, as shown in Fig. 2. When in this position and the weight of the car, for example, is imposed upon the supporting plate 13 and the overlapping lips 14, the legs 10 are held against the possibility of being collapsed or folded together. Also contributing to this result I so arrange the pivotal connections 16 and 17 of the links 15 with the lower ends of the legs and center plate 19, respectively, that when in distended position, the axes of the pivotal connections 17 lie below the horizontal plane containing the pivotal axes 16, thus enabling the linkage connection to pass slightly beyond the dead center relation when the parts are in distended position ready for use.

In order to fold or to collapse the device, the weight to be supported is raised therefrom, thereby releasing the overlapping lips 14, whereupon the plate 19 of the linkage connections at the lower ends of the legs may be easily and readily raised upwardly, thereby rocking the links 15 about their pivotal connections 16, and permitting the legs to close upon each other towards a common center, the links 15 being received within the open channels of the legs, and hence enabling the device to be folded into a comparatively small compact condition.

If desired, the corners of the supporting plate 13 may be formed into upturned lips 21, to afford more effective means for retaining and preventing sidewise slippage of part of the body to be supported when resting upon the supporting plate.

In the manufacture of the device I prefer to employ sheet steel stampings for the various parts, the legs being formed from channel stampings of commercial form, and the plates 13, 19, and links 15 being suitably stamped members, thus making a comparatively light and yet exceedingly strong and sturdy structure.

While I have described a supporting stand embodying the principles of my invention, with special reference to its function as a support for an automobile body, and as an accessory tool of convenience to form part of the tool equipment for an automobile, I do not desire to be limited or restricted in respect to such use, as a supporting stand embodying the construction above described may be useful in many other situations where a device of this nature may be used.

Having now set forth the objects and nature of my invention and a structure embodying the principles thereof, what I claim as new and useful and of my own invention and desire to secure by Letters Patent is:

1. An automobile body supporting stand comprising a supporting plate having openings formed therethrough, supporting legs pivotally connected at their upper ends to said plate, and having lips extending through said openings, said lips extending towards and overlapping each other, and a linking connection connecting the lower ends of said legs.

2. An automobile supporting stand comprising a supporting plate having portions pressed out therefrom to form pivot ears, and supporting legs having lips overlapping each other, said legs being pivotally connected at their upper ends to said pivot ears, a link pivotally connected to the lower end of each leg and a central plate to which all the links are pivotally connected, said links having extended ends to engage and bear on the upper surface of said central plate when said legs are spread apart from each other to form a limiting stop therefor.

3. An automobile supporting stand comprising a supporting plate having portions pressed out therefrom to form pivotal ears, and supporting legs pivotally connected at their upper ends to said pivot ears, centrally overlapping projections on said legs for limiting their movement, a link pivotally connected to the lower end of each leg, and a central plate to which all the links are pivotally connected, the horizontal plane containing the pivotal axes of the connections of said links to the central plate lying below the horizontal plane containing the pivotal axis of the connections of said links to the legs when said legs are in their distended relation.

4. An automobile supporting stand comprising a supporting plate having portions pressed out therefrom to form pivotal ears, and supporting legs having lips overlapping each other, said legs being pivotally connected at their upper ends to said pivot ears, a link pivotally connected to the lower end of each leg, and a central plate to which all the links are pivotally connected, the horizontal plane containing the pivotal axes of the connections of said links to the central plate lying below the horizontal plane containing the pivotal axis of the connections of said links to the legs when said legs are in their distended relation, said links having extensions beyond their pivotal connections to said central plate, said extensions engaging and bearing on said central plate to form a limit stop.

5. An automobile supporting stand comprising a supporting plate having openings formed therethrough and pivot ears formed at opposite sides of said openings, supporting legs having lips at their upper ends arranged to extend through said openings and towards a common center in overlapping relation with respect to each other, said legs being pivotally connected at their upper ends to said ears, and a linkage connection for the lower ends of said legs.

6. An automobile supporting stand comprising a supporting plate having openings formed therethrough and pivot ears formed at opposite sides of said openings, supporting legs of channel shape in cross section having their side walls pivotally connected at their upper ends to said ears, the base wall of said legs having lips at their upper ends extending beyond the side walls of said legs and projecting through said openings and into overlapping relation with respect to each other, the channels of said legs presenting inwardly towards each other, and links connecting the lower ends of said legs, said links being received in said channels when the legs are folded together.

In testimony whereof I have hereunto set my hand on this 16th day of September A. D., 1921.

WILLIAM BARBER.